(12) United States Patent
Matsutani et al.

(10) Patent No.: US 8,366,182 B2
(45) Date of Patent: Feb. 5, 2013

(54) STRUCTURE FOR VEHICLE HIGH-STRENGTH MEMBER

(75) Inventors: You Matsutani, Saitama (JP); Masato Abe, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 0 days.

(21) Appl. No.: 13/132,128

(22) PCT Filed: Dec. 1, 2009

(86) PCT No.: PCT/JP2009/070165
§ 371 (c)(1), (2), (4) Date: Jun. 1, 2011

(87) PCT Pub. No.: WO2010/064624
PCT Pub. Date: Jun. 10, 2010

(65) Prior Publication Data
US 2011/0233964 A1 Sep. 29, 2011

(30) Foreign Application Priority Data
Dec. 1, 2008 (JP) .................................. 2008-306725

(51) Int. Cl.
*B62D 25/14* (2006.01)
(52) U.S. Cl. .............................. 296/193.02; 296/187.05
(58) Field of Classification Search ............. 296/187.05, 296/193.02, 70, 72
See application file for complete search history.

(56) References Cited

U.S. PATENT DOCUMENTS

| | | | |
|---|---|---|---|
| 6,250,678 B1 | 6/2001 | Yoshinaka et al. | |
| 7,658,439 B2 * | 2/2010 | Meier | 296/193.02 |
| 8,177,044 B2 * | 5/2012 | Murayama et al. | 188/377 |
| 2004/0135400 A1 * | 7/2004 | Matsuzaki et al. | 296/193.02 |
| 2005/0134090 A1 * | 6/2005 | Kring et al. | 296/193.02 |
| 2007/0085252 A1 * | 4/2007 | Murayama et al. | 267/152 |
| 2008/0048470 A1 * | 2/2008 | Vican | 296/193.02 |

(Continued)

FOREIGN PATENT DOCUMENTS

| | | |
|---|---|---|
| EP | 1 816 055 | 8/2007 |
| JP | 3-50584 | 5/1991 |

(Continued)

OTHER PUBLICATIONS

International Search Report issued Mar. 16, 2010 in International (PCT) Application No. PCT/JP2009/070165.

(Continued)

*Primary Examiner* — Jason S Morrow
(74) *Attorney, Agent, or Firm* — Wenderoth, Lind & Ponack, L.L.P.

(57) ABSTRACT

A high-strength element structure for a vehicle body has high strength and rigidity effectively maintained while an increase in weight is reduced. The structure includes a vehicle high-strength element body which is provided at a front in a vehicle cabin of a vehicle and extends substantially in a vehicle width direction, in which the vehicle high-strength element body has a circular pipe-like cross section, and comprises partial high rigidity portions only in an inner diameter portion thereof without any change in an outer diameter shape; and the vehicle high-strength element body is functionally divided at least into a driver's seat-side portion and a passenger's seat-side portion, and the high rigidity portion of the driver's seat-side portion and the high rigidity portion of the passenger's seat-side portion are differently configured from each other.

9 Claims, 6 Drawing Sheets

U.S. PATENT DOCUMENTS

| | | | |
|---|---|---|---|
| 2009/0026801 A1* | 1/2009 | Murayama et al. | 296/187.05 |
| 2009/0174223 A1* | 7/2009 | Penner et al. | 296/193.02 |
| 2011/0278876 A1* | 11/2011 | Hitz et al. | 296/72 |
| 2012/0049574 A1* | 3/2012 | Atsumi et al. | 296/193.02 |
| 2012/0139283 A1* | 6/2012 | Ono et al. | 296/70 |

FOREIGN PATENT DOCUMENTS

| | | |
|---|---|---|
| JP | 5-330452 | 12/1993 |
| JP | 2001-253368 | 9/2001 |
| JP | 2002-211440 | 7/2002 |
| JP | 2006-143156 | 6/2006 |

OTHER PUBLICATIONS

Supplementary European Search Report issued Apr. 12, 2012 in European Patent Application No. EP 09 83 0390.

* cited by examiner

STRUCTURE FOR VEHICLE HIGH-STRENGTH MEMBER

BACKGROUND OF THE INVENTION

I. Technical Field

The present invention relates to a vehicle high-strength element structure.

II. Description of the Related Art

A vehicle, such as an automobile, comprises a resin instrument panel (vehicle cabin front interior panel) in the front of a vehicle cabin. The instrument panel comprises a high-strength element for a vehicle body made of metal (disclosed in Japanese Patent Application Publication No. Hei. 05-330452, for example).

For example, as shown in FIGS. 7 and 8, this vehicle high-strength element 1 includes a vehicle high-strength element body 3 extending substantially in a vehicle width direction 2 and whose cross section is typically in a circular pipe-like shape as a whole. The pipe-like vehicle high-strength element body 3 is configured to be thick in diameter on a driver's seat side and thin on a passenger's seat side due to a difference in required strength (see FIG. 9). The vehicle high-strength element body 3 comprises a large-diameter pipe portion 4 on the driver's seat side, a small-diameter pipe portion 5 on the passenger's seat side and a short tapered joint portion 6 which can negate the difference in diameter between the two pipe portions to join them.

The large-diameter pipe portion 4 and the tapered joint portion 6 as well as the tapered joint portion 6 and the small-diameter pipe portion 5 are directly welded circumferentially (circumferential welded portion). In FIG. 7, the vehicle high-strength element body 3 is for left-hand steering wheel and the large-diameter pipe portion 4 on the driver's seat side is shown in the left side of the drawing while the small-diameter pipe portion 5 on the passenger's seat side is shown in the right side of the drawing. Alternatively, the vehicle high-strength element body 3 can be for right-hand steering wheel.

Various brackets 7 are attached to the vehicle high-strength element body 3.

Specifically, the vehicle high-strength element body 3 includes, at both ends, side brackets 8 fixable to left and right vehicle body panels (not-shown side panels), respectively.

Further, the vehicle high-strength element body comprises a stay 11 in a middle part thereof in the vehicle width direction 2. The stay 11 is configured to fix a lower part of the vehicle high-strength element body 3 to a floor panel (not shown) of the vehicle cabin to support the vehicle high-strength element body 3 in a vertical direction 9. The stay 11 extends substantially in the vertical direction 9. The number of such stay 11 is generally only one or two, and FIG. 7 shows an example of a single stay. The stay 11 is attached to a portion near a boundary between the large-diameter pipe portion 4 and the small-diameter pipe portion 5 (near an inner end of the large-diameter pipe portion 4 in FIG. 7).

Further, the vehicle high-strength element body 3 includes a post bracket 13 in a middle part in the vehicle width direction 2. The post bracket 13 fixes a vehicle front portion of the vehicle high-strength element body 3 to a front wall (dash panel, not shown) of the vehicle cabin, to support the vehicle high-strength element body 3 substantially in a vehicle front-back direction 12. The post bracket 13 extends substantially in the vehicle front-back direction 12.

Further, the vehicle high-strength element body 3 includes column brackets 15 and 16 in a middle part in the vehicle width direction 2. The column brackets 15 and 16 fix a steering column 14 (not shown) to a lower part of the vehicle high-strength element body 3, to hold (suspend) the steering column 14.

The post bracket 13 and the column brackets 15 and 16 are attached to about a center of the large-diameter pipe portion 4 in the vehicle width direction 2 on the driver's seat side. The steering column 14 is inclined downward, extending from the rear to the front substantially in the vehicle front-back direction 12. Furthermore, the post bracket 13 includes a column bracket support portion 17 which connects the front wall part (dash panel) of the vehicle cabin to the column bracket 15. With the body portion (pipe support portion) and the column bracket supporting part 17, the post bracket 13 has a substantially laid-down "V" shape in a side view.

Further, the vehicle high-strength element body 3 can include a knee protector bracket (not shown) or the like, for example, in the large-diameter pipe portion 4 or the small-diameter pipe portion 5 as needed, to receive and protect the knees of occupants on the driver's seat and the passenger's seat when the vehicle body receives a load.

Japanese Patent Application Publication No. Hei. 05-330452

SUMMARY OF THE INVENTION

However, such a high-strength element structure for a vehicle body has the following problems.

That is, the vehicle high-strength element body 3 is required to have high strength (such as flexural strength) and high rigidity (such as torsional rigidity) in order to function as a reinforcement element. In view of improving the strength and rigidity of the vehicle high-strength element body 3 of a hollow pipe with a circular cross section, it can adopt the following structures as shown in FIG. 10:

Method 1: a thick-walled pipe (circumferentially increase the wall thickness of the pipe)

Method 2: a pipe whose cross section is other than circular (non-circular cross section)

Method 3: a beam provided inside a pipe.

Further, a beam inside a pipe in Method 3 can be formed by bending a plate (an example shown in the upper column in the item 3 in FIG. 10) or by extrusion (an example shown in the lower column of the item 3 in FIG. 10). The beam formed by bending a plate is suitable for the vehicle high-strength element body 3 made of iron, and the beam formed by extrusion is suitable for the vehicle high-strength element body 3 made of light alloy.

However, there is a problem with a thick-walled pipe according to Method 1 in increasing the weight of the vehicle high-strength element body 3.

Also, a pipe with a non-circular cross section according to Method 2 has problems of an increase in the weight of the vehicle high-strength element body 3 and a difficulty in joining the large-diameter pipe portion 4 on the driver's seat side and the small-diameter pipe portion 5 on the passenger's seat-side and attaching the above various brackets 7. In particular, it is necessary to smoothly join the outer faces of the large-diameter pipe portion 4 and the small-diameter pipe portion 5 so as not to cause stress concentration upon receiving a load from (front) the vehicle front-back direction 12 at the time of emergency. However, it is difficult to smoothly join the outer surfaces of the pipe portions having a non-circular cross section.

Moreover, a problem with the beam inside a pipe according to Method 3 is an increase in the weight of the vehicle high-strength element body 3, and this does not effectively contribute to improving the torsional rigidity.

As described above, any of Methods 1 to 3 cannot effectively achieve high strength and rigidity without a weight increase.

It should be noted that, it is conceivable that new problems or other problems occur in addition to the above problems in the course of developing the present invention. Such new problems or other problems will be described in an embodiment of the present invention instead of this section. However, such description in the embodiment may also be added to this section when necessary. In such a case, such description may be modified to be suited for description in this section.

A high-strength element structure for a vehicle body according to the present invention comprises a vehicle high-strength element body which is provided at a front of a vehicle cabin and extends substantially in a vehicle width direction, wherein the vehicle high-strength element body has a cross section of a circular pipe-like shape and comprises a partial high rigidity portion only in an inner diameter portion without any change in shape of an outer diameter; and the vehicle high-strength element body is functionally divided at least into a driver's seat-side portion and a passenger's seat-side portion, and the high rigidity portion of the driver's seat-side portion and the high rigidity portion of the passenger's seat-side portion are differently configured from each other.

Preferably, the vehicle high-strength element body comprises a stay in a middle part in the vehicle width direction which is vertically supportable of a lower part of the vehicle high-strength element body, and the vehicle high-strength element body is structurally divided into a driver's seat-side portion and a passenger's seat-side portion from a position of the stay.

Preferably, the driver's seat-side portion includes, as the high rigidity portion, a high rigidity portion for an upper half driver's seat-side portion in an upper half thereof, and a high rigidity portion for a lower half driver's seat-side portion in a lower half thereof.

Preferably, the high rigidity portion for an upper half driver's seat-side portion is a torsional deformation reducing portion which is provided in a rear half of the driver's seat-side portion in a vehicle front-back direction and can reduce and prevent torsional deformation of the driver's seat-side portion.

Preferably, the high rigidity portion for a lower half driver's seat-side portion is a vertical flexure reducing portion which is provided in a middle of the driver's seat-side portion in a vehicle front-back direction and can reduce and prevent vertical flexure of the driver's seat-side portion.

Preferably, the passenger's seat-side portion includes, as the high rigidity portion, a high rigidity portion for a front half passenger's seat-side portion in a front half thereof, and a high rigidity portion for a rear half passenger's seat portion in a rear half thereof.

Preferably, the high rigidity portions for the front half and rear half passenger's seat-side portions are both provided in a middle of the passenger's seat-side portion in the vertical direction to be able to reduce and prevent flexure of the passenger's seat-side portion in the vehicle front-back direction.

Preferably, the high rigidity portions are increased thickness portions or reinforced rib portions and partially provided in the inner diameter portion of the vehicle high-strength element body.

Note that the above configurations are minimally required for realizing desired effects. Thus, needless to say, detail of the above configurations or non-described configurations may be added flexibly. Moreover, matters conceivable from the description of the above configurations are considered to be included in the scope of this description even without any specific reference to such matters. Further, with an addition of any configuration other than the above configurations, it should be considered that the effect of the added configuration is added to that of the present invention.

A high-strength element structure for a vehicle body according to the present invention comprises a vehicle high-strength element body which is provided at a front of a vehicle cabin and extends substantially in a vehicle width direction, wherein the vehicle high-strength element body has a cross section of a circular pipe-like shape and comprises a partial high rigidity portion only in an inner diameter portion without any change in shape of an outer diameter; and the vehicle high-strength element body is functionally divided at least into a driver's seat-side portion and a passenger's seat-side portion, and the high rigidity portion of the driver's seat-side portion and the high rigidity portion of the passenger's seat-side portion are differently configured from each other.

According to such a configuration, the following effect can be obtained. Specifically, owing to having the high rigidity portions partially in the inner diameter portion, the vehicle high-strength element body can have high strength (such as flexural strength) and high rigidity (such as torsional rigidity) with an increase in the weight thereof reduced to a minimum. In addition, no change is made to the outer diameter shape of the vehicle high-strength element body with a circular cross section (the outer diameter shape remains circular), so that various brackets and the like are easily attachable to the vehicle high-strength element body as in the prior art without any change in the specification of the brackets.

Further, the high rigidity portion of the driver's seat-side portion and the high rigidity portion of the passenger's seat-side portion functionally divided are differently configured according to a purpose of the rigidity enhancement, so that they can be provided with the required strength and rigidity intensively to required portions thereof. Thereby, in comparison with the high rigidity portions of the same configuration uniformly provided in the driver's and passenger's seat-side portions, the vehicle high-strength element body 23 can be flexibly designed to be less in weight and at the same time, and enhanced in strength/rigidity.

Preferably, the vehicle high-strength element body comprises a stay in a middle part in the vehicle width direction which is vertically supportable of a lower part of the vehicle high-strength element body, and the vehicle high-strength element body is structurally divided into the driver's seat-side portion and the passenger's seat-side portion from a position of the stay.

According to this configuration, the following effect can be obtained. Specifically, the stay provided in the middle part of the vehicle high-strength element body in the vehicle width direction functions to support the vehicle high-strength element body in the vertical direction. Then, the vehicle high-strength element body is structurally divided into the driver's seat-side portion and the passenger's seat-side portion from the position of the stay. Thereby, the vehicle high-strength element body can be structurally divided most effectively. Moreover, the purpose of the functional division of the vehicle high-strength element body into the driver's seat-side portion and the passenger's seat-side portion can be achieved more effectively. Further, since the outer diameter shape of the vehicle high-strength element body having a pipe-like circular cross section does not need to be changed, the structurally divided driver's seat-side portion and the passenger's seat-side portion can be joined to each other easily. For example, a joint element can be used to fit the inner ends of the driver's seat-side portion 43 and the passenger's seat-side portion 44 into each other.

Preferably, the driver's seat-side portion includes, as the high rigidity portion, a high rigidity portion for an upper half driver's seat-side portion in an upper half thereof, and a high rigidity portion for a lower half driver's seat-side portion in a lower half thereof.

According to this configuration, the following effect can be obtained. Specifically, with the provision of the high rigidity portion for the upper half driver's seat-side portion, the upper half of the driver's seat-side portion is intentionally given particularly required strength and rigidity. Likewise, with the provision of the high rigidity portion for the lower half driver's seat-side portion, the lower half of the driver's seat-side portion is intentionally given particularly required strength and rigidity.

Preferably, the high rigidity portion for an upper half driver's seat-side portion is a torsional deformation reducing portion which is provided in a rear half of the driver's seat-side portion in a vehicle front-back direction and can reduce and prevent torsional deformation of the driver's seat-side portion.

According to this configuration, the following effect can be obtained. Specifically, with the provision of the torsional deformation reducing portion in the rear half of the driver's seat-side portion as the high rigidity portion for the upper half driver's seat-side portion, the strength and rigidity of this portion can be improved intensively and efficiently to thereby reduce and prevent the torsional deformation of the driver's seat-side portion effectively. This makes it possible to reduce the influence of, for example, the load of supporting the steering column and the moment or the like from the knee protector produced when a load is applied to the vehicle, on the upper half part of the driver's seat-side portion.

Preferably, the high rigidity portion for the lower half driver's seat-side portion is a vertical flexure reducing portion which is provided in the middle of the driver's seat-side portion in the vehicle front-back direction and can reduce and prevent vertical flexure of the driver's seat-side portion.

According to this configuration, the following effect can be obtained. Specifically, with the provision of the vertical flexure reducing portion in the vehicle front-back direction as the high rigidity portion for the lower half driver's seat-side portion, the middle part of the driver's seat-side portion can be improved in the strength and rigidity intensively and efficiently to thereby effectively reduce and prevent the flexure of the driver's seat-side portion in the vertical direction. This makes it possible to reduce the influence of, for example, the vibration of the vehicle and the like on the lower half of the driver's seat-side portion.

Preferably, the passenger's seat-side portion includes, as the high rigidity portion, the high rigidity portion for the front half passenger's seat-side portion in a front half thereof, and the high rigidity portion for the rear half passenger's seat portion in the rear half thereof.

According to this configuration, the following effect can be obtained. Specifically, with the provision of the high rigidity portion for the front half passenger's seat-side portion, the front half of the passenger's seat-side portion is intentionally given particularly required strength and rigidity. Likewise, with the provision of the high rigidity portion for the rear half passenger's seat-side portion, the rear half of the passenger's seat-side portion 44 is intentionally given particularly required strength and rigidity.

Preferably, the high rigidity portions for the front half and rear half passenger's seat-side portions are both provided in a middle of the passenger's seat-side portion in the vertical direction to be able to reduce and prevent flexure of the passenger's seat-side portion in the vehicle front-back direction.

According to this configuration, the following effect can be obtained. Specifically, with the provision of the vehicle longitudinal flexure reducing portions and as the high rigidity portions for the front half passenger's seat-side portion and for the rear half passenger's seat-side portion, the middle part of the passenger's seat-side portion in the vertical direction can be improved in the strength and rigidity intensively and efficiently to thereby reduce and prevent the flexure of the passenger's seat-side portion in the vehicle front-back direction. This makes it possible to reduce the influence of, for example, a load acted on the front half and rear half of the passenger's seat-side portion in the vehicle front-back direction in case of emergency or the like.

Preferably, the high rigidity portions are increased thickness portions or reinforced rib portions and partially provided in the inner diameter portion of the vehicle high-strength element body.

According to this configuration, the following effect can be obtained. Specifically, owing to the increased thickness portions or the reinforced rib portions partially in the inner diameter portion as the high rigidity portions, the vehicle high-strength element body in a simple configuration is provided with high strength and high rigidity effectively and reliably.

BRIEF DESCRIPTION OF THE DRAWINGS

FIG. 2 VIEW-B is a cross-sectional view of a passenger's seat-side portion of FIG. 1 in the vehicle front-back direction.

FIG. 9 VIEW-B is a cross-sectional view of a passenger's seat-side portion of FIG. 7 in the vehicle front-back direction.

DETAILED DESCRIPTION OF THE INVENTION

The present invention mainly aims to achieve a high-strength element structure for a vehicle body of high strength and rigidity effectively maintained without a weight increase.

Hereinafter, an embodiment for implementing the present invention will be described with the accompanying drawings.

Note that since the following embodiment is closely related to the above-described background art, problems to be solved by the invention, and the like, the description in these sections can be used herein directly or with necessary modification when needed.

Embodiment

FIGS. 1 to 6 show the embodiment of the present invention and a modified example thereof.

First, a basic structure of the present invention will be described.

A vehicle such as an automobile includes a resin instrument panel at a front of a vehicle cabin. The instrument panel includes a high-strength element for a vehicle body made of metal.

Figure 1:
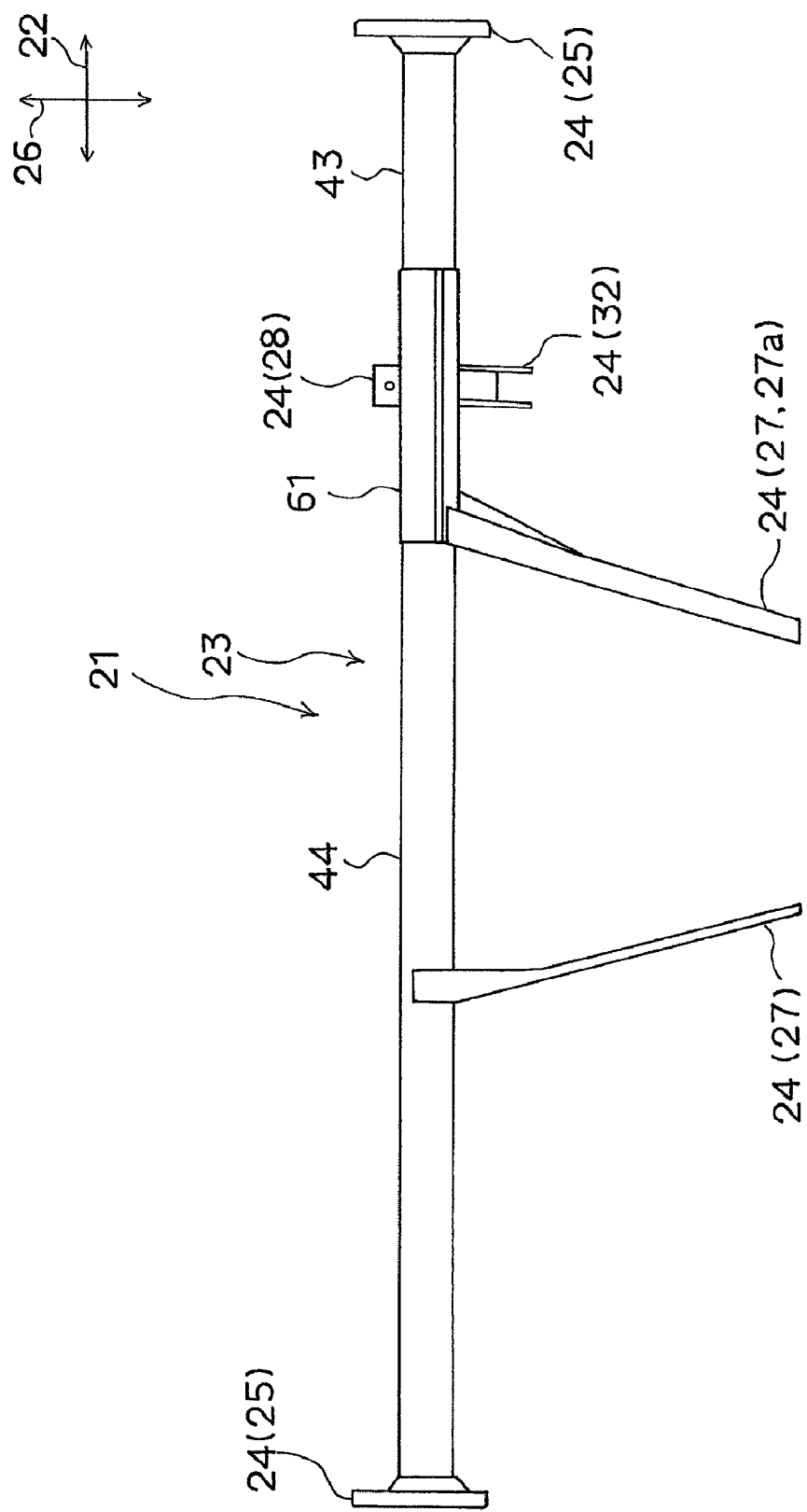
FIG. 1 is a front view of a high-strength element structure for a vehicle body according to an embodiment of the present invention.

As shown in FIG. 1, this vehicle high-strength element 21 comprises a vehicle high-strength element body 23 extending substantially in a vehicle width direction 22. The vehicle high-strength element body 23 is of a pipe-like shape as a whole and a cross section thereof is circular.

Moreover, various brackets 24 are attached to the vehicle high-strength element body 23.

Specifically, the vehicle high-strength element body 23 includes, at both ends, side brackets 25 fixable to the vehicle high-strength element body 23 to left and right vehicle body panels (not-shown side panels).

Further, the vehicle high-strength element body 23 includes a stay 27 attached to a middle part of in the vehicle width direction 22. The stay 27 fixes a lower part of the vehicle high-strength element body 23 to a floor panel (not shown) of the vehicle cabin, to support it in a vertical direction 26. The stay 27 extends substantially in the vertical direction 26. Note that, the number of stays 27 is generally one or two, and FIG. 1 shows an example of two stays.

Figure 2:
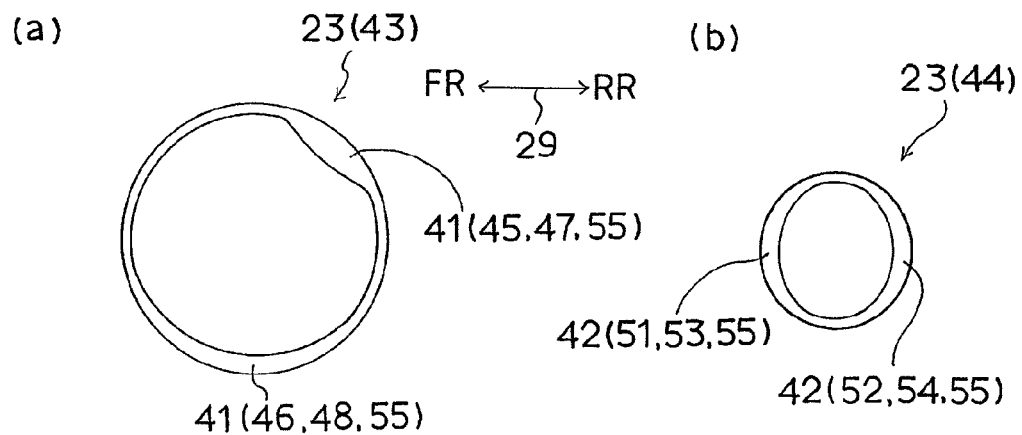
FIG. 2 VIEW-A is a cross-sectional view of a driver's seat-side portion of FIG. 1 in a vehicle front-back direction.

Further, the vehicle high-strength element body 23 includes, in a middle part, a post bracket 28 in the vehicle width direction 22 which fixes the vehicle front portion to a front wall portion (not-shown dash panel) of the vehicle cabin, to support the vehicle high-strength element body 23 substantially in a vehicle front-back direction 29 (see FIG. 2 and else). The post bracket 28 extends substantially in the vehicle front-back direction 29.

Further, the vehicle high-strength element body 23 includes, in a middle part, a column bracket 32 in the vehicle width direction 22 which fixes a steering column 14 (not shown) to a lower part of the vehicle high-strength element body 23, to hold (suspend) the steering column. The steering column extends from forward to backward in the vehicle front-back direction 29 in such a way as to be inclined upward.

Further, the vehicle high-strength element body 23 includes a knee protector bracket (not shown) or the like to which a knee protector is attached, for example, as needed. The knee protector is configured to receive and protect the knees of an occupant on the driver's seat or on the passenger's seat when a load acts on the vehicle body.

In addition to the above basic configuration, the high-strength element structure for a vehicle body according to the present embodiment includes the following elements.

(a) As shown in FIG. 2, the vehicle high-strength element body 23 includes partial high rigidity portions 41 and 42 only in an inner diameter portion which has a pipe-like, circular cross section without any change in shape of an outer diameter (remains circular).

Here, it is preferable that the high rigidity portions 41 and 42 are provided in the vehicle high-strength element body 23 in a uniform thickness in its circumferential direction. How-ever, it is possible to provide them in the vehicle high-strength element body 23 in a non-uniform thickness in the circumferential direction.

(b) The vehicle high-strength element body 23 is functionally divided at least into a driver's seat-side portion 43 and a passenger's seat-side portion 44. Then, the high rigidity portions 41 and 42 of different structures are provided to the driver's seat-side portion 43 and the passenger's seat-side portion 44, respectively.

Note that, the above description includes the driver's seat-side portion 43 and the passenger's seat-side portion 44 formed of one continuous vehicle high-strength element body 23 and functionally different from each other.

(c) The stay 27 which supports the lower part of the vehicle high-strength element body 23 in the vertical direction 26 is provided in the middle part of the vehicle high-strength element body 23 in the vehicle width direction 22. Then, the vehicle high-strength element body 23 is structurally divided into the driver's seat-side portion 43 and the passenger's seat-side portion 44 from the stay 27.

Here, with two stays 27 provided, not a passenger's seat-side stay 27 but a driver's seat-side stay 27 (27a) is set as the boundary for the structural division. In other words, an inner end of the driver's seat-side portion 43 can extend at maximum to about the position of the driver's seat-side stay 27a; likewise, an inner end of the passenger's seat-side portion 44 can extend at maximum to about the position of the driver's seat-side stay 27a. Note that, the inner end of the driver's seat-side portion 43 does not reach the position of the driver's seat-side stay 27, as described above.

(d) As shown in FIG. 2 VIEW-A, as the high rigidity portions 41 of the driver's seat-side portion 43, a high rigidity portion for an upper half driver's seat-side portion 45 is provided in an upper half of the driver's seat-side portion 43, and a high rigidity portion for a lower half driver's seat-side portion 46 is provided in a lower half of the driver's seat-side portion 43.

(e) Here, as shown in FIG. 2 VIEW-A, the high rigidity portion for an upper half driver's seat-side portion 45 is set to a torsional deformation reducing portion 47 which is provided in a rear half of the driver's seat-side portion 43 in the vehicle front-back direction 29 and can reduce and prevent the torsional deformation of the driver's seat-side portion 43.

Figure 3:
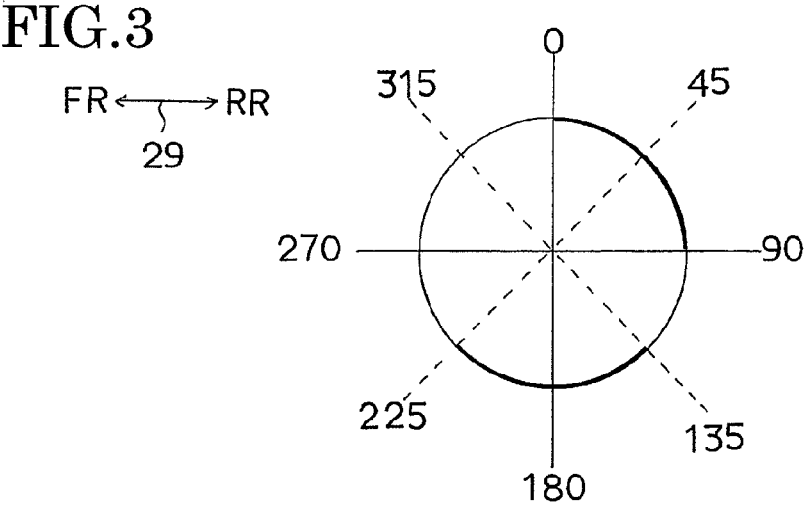
FIG. 3 shows set positions of a high rigidity portion for a driver's seat-side portion.

The torsional deformation reducing portion 47 is provided in a portion in the range of about 0° to 90° in the cross-sectional view in the vehicle front-back direction in FIG. 3, for example.

(d) Moreover, as shown in FIG. 2 VIEW-A, the high rigidity portion for a lower half driver's seat-side portion 46 is a vertical flexure reducing portion 48 which is provided in a middle part of the driver's seat-side portion 43 in the vehicle front-back direction 29 and can reduce and prevent the flexure of the driver's seat-side portion 43 in the vertical direction 26.

The vertical flexure reducing portion 48 is provided in a portion in the range of about 135° to 225° in the cross-sectional view in the vehicle front-back direction in FIG. 3, for example.

(g) As the high rigidity portions 42 of the passenger's seat-side portion 44, a high rigidity portion for a front half passenger's seat-side portion 51 is provided in a front half of the passenger's seat-side portion 44. A high rigidity portion for a rear half passenger's seat-side portion 52 is provided in a rear half of the passenger's seat-side portion 44, as shown in FIG. 2 VIEW-B.

(h) Here, as shown in FIG. 2 VIEW-B, the high rigidity portions for the front half passenger's seat-side portion 51 and for the rear half passenger's seat-side portion 52 are set to be vehicle longitudinal flexure reducing portions 53 and 54 which are provided in an middle part of the passenger's seat-side portion 44 in the vertical direction 26 and can reduce and prevent the flexure of the passenger's seat-side portion 44 in the vehicle front-back direction 29.

Figure 4:
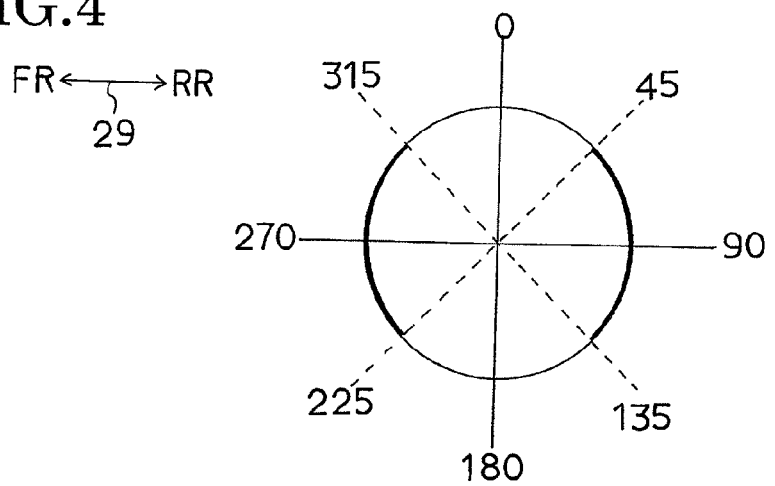
FIG. 4 shows set positions of a high rigidity portion for a passenger's seat-side portion.

The vehicle longitudinal flexure reducing portion 53 of the high rigidity portion for the front half passenger's seat-side portion 51 is provided in a portion in the range of about 225° to 315° in the cross-sectional view in the vehicle front-back direction in FIG. 4, for example. The vehicle longitudinal flexure reducing portion 54 of the high rigidity portions for the rear half passenger's seat-side portion 52 is provided in a portion in the range of about 45° to 135° in the cross-sectional view in the vehicle front-back direction in FIG. 4, for example.

Figure 5:
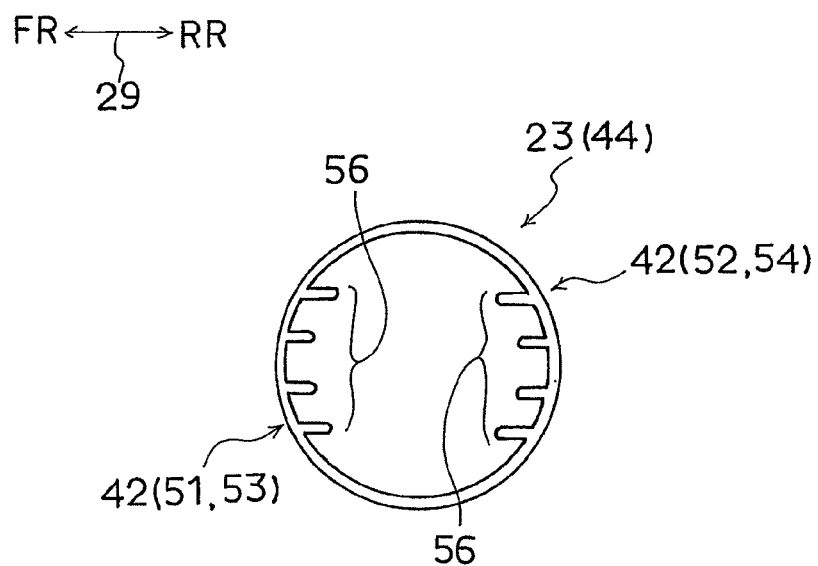
FIG. 5 is a cross-sectional view of reinforced rib portions as the high rigidity portions in the vehicle front-back direction.

(i) The high rigidity portions 41 and 42 are increased thickness portions 55 as shown in FIG. 2 or reinforced rib portions 56 as shown in FIG. 5 which are partially provided in the inner diameter of the vehicle high-strength element body 23.

In FIG. 5, the reinforced rib portions 56 are provided in parallel with one another at predetermined intervals.

Note that, although FIG. 5 shows the structure of the passenger's seat-side portion 44, for example, the reinforced rib portions 56 can be provided in the driver's seat-side portion 43 similarly.

(j) The configurations other than the above are as follows.

The driver's seat-side portion 43 and the passenger's seat-side portion 44 can be made of iron or light alloy.

Figure 6:
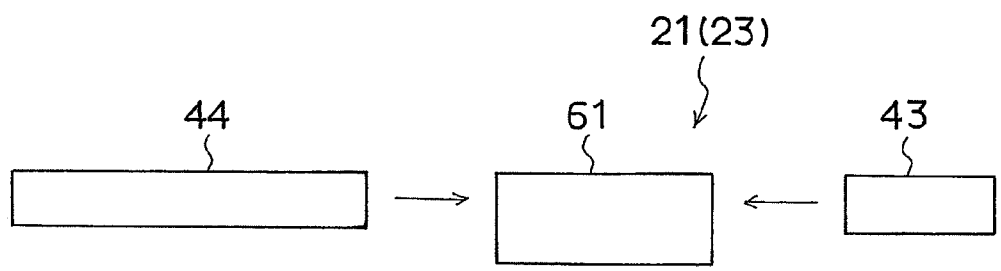
FIG. 6 shows a structure of an attachment portion of the high-strength element structure for a vehicle body.
Figure 7:
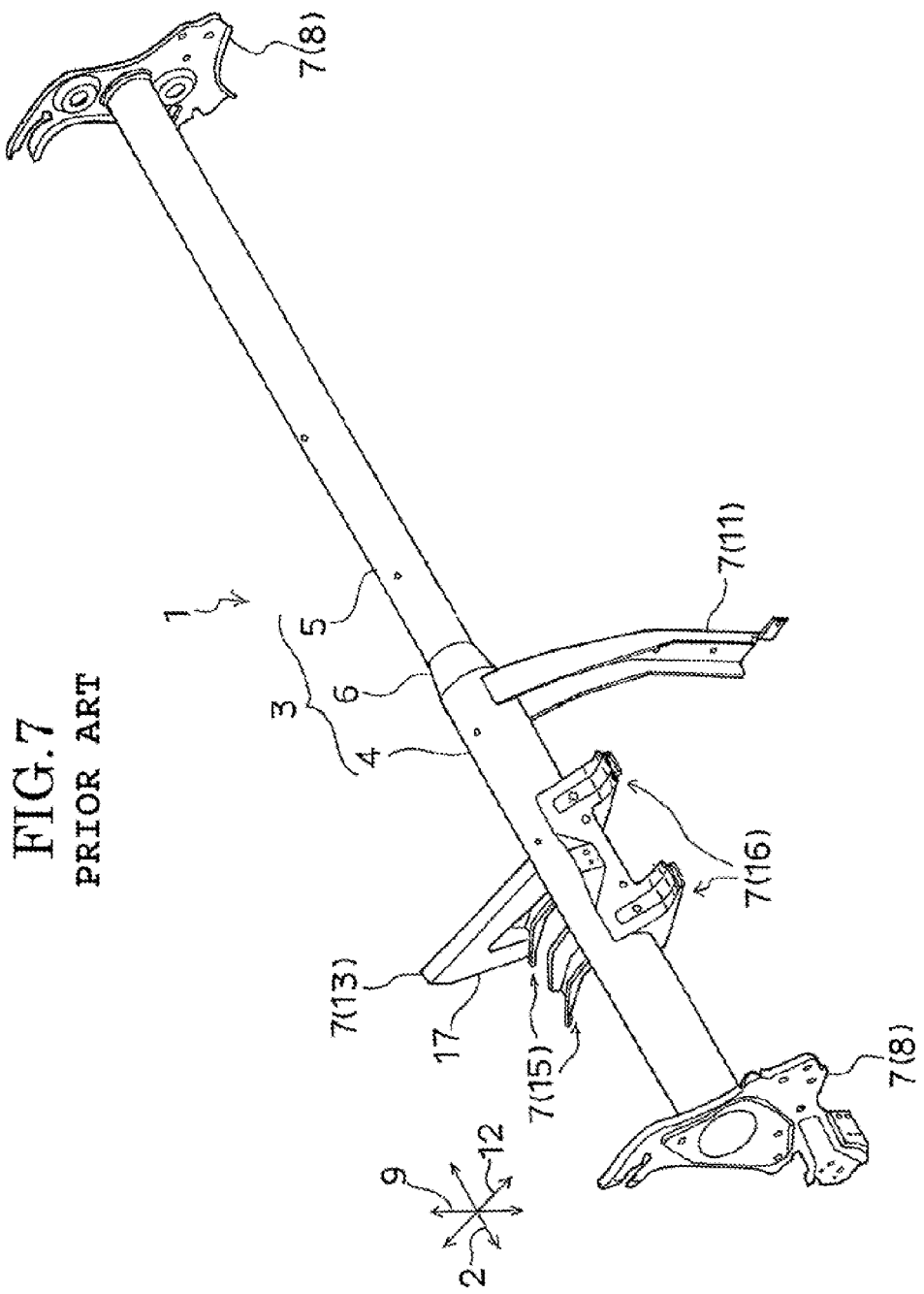
FIG. 7 is a perspective view of a prior art example of a high-strength element structure for a vehicle body.
Figure 8:
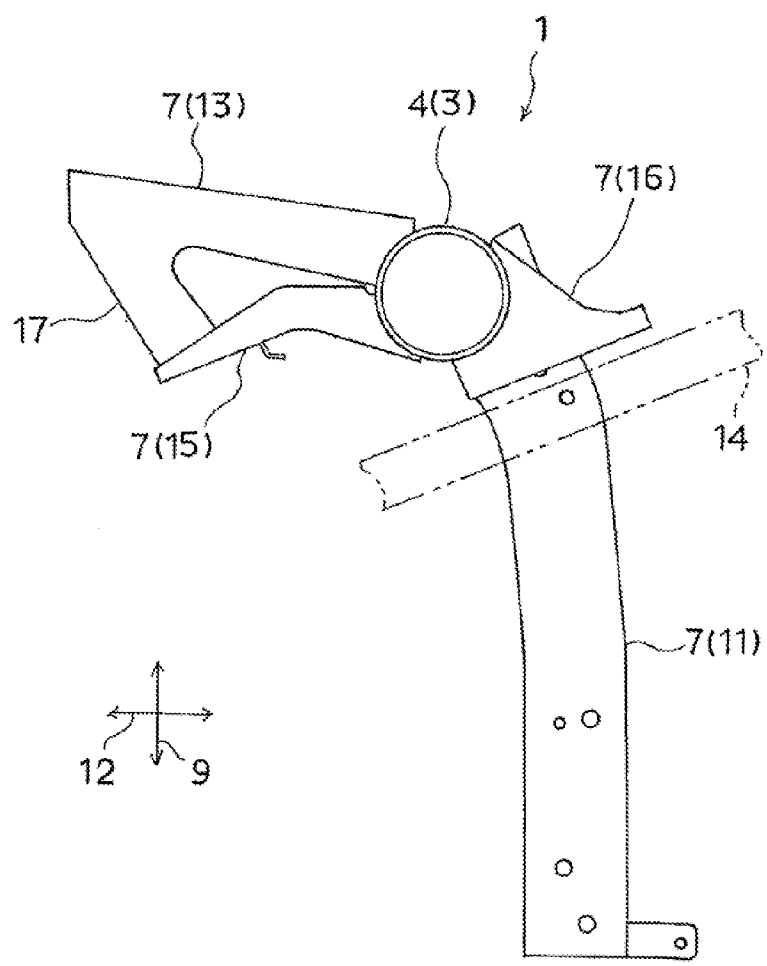
FIG. 8 is a side view of the high-strength element structure for a vehicle body of FIG. 7.
Figures 9, 10:
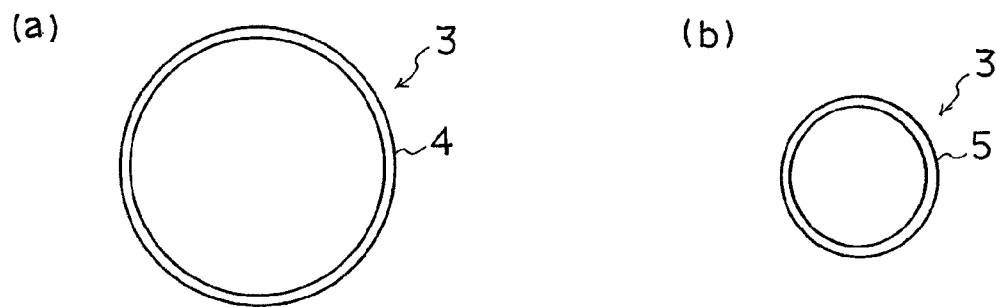
FIG. 9 VIEW-A is a cross-sectional view of a driver's seat-side portion of FIG. 7 in a vehicle front-back direction.
FIG. 10 is a table listing examples of structures for enhancing the strength, torsional rigidity, and the like of the vehicle high-strength element body.

In this case, as shown in FIG. 6, the driver's seat-side portion 43 and the passenger's seat-side portion 44 are connected to each other via a connecting element 61 placed between the inner ends thereof.

In this case, the driver's seat-side portion 43 and the passenger's seat-side portion 44 are pressed into the connecting element 61 to integrally connect with each other. To this end, the connecting element 61 comprises at both ends press-in holes corresponding to the inner ends of the driver's seat-side portion 43 and the passenger's seat-side portion 44. Also, predetermined margins for the press-in holes are formed in the inner ends of the driver's seat-side portion 43 and the passenger's seat-side portion 44. The connecting element 61 can be preferably a pipe-like element forming a tubular space of a uniformly closed cross-section in which both press-in holes are joined to each other (columnar pipe).

Note that, the driver's seat-side portion 43 and the passenger's seat-side portion 44 can have the same diameter as shown in FIG. 1 or different diameters as shown in FIG. 2.

Here, when the driver's seat-side portion 43 and the passenger's seat-side portion 44 have the same diameter, the press-in holes of the driver's seat-side portion 43 and the passenger's seat-side portion 44 have the same diameter in the connecting element 61.

On the other hand, when the driver's seat-side portion 43 and the passenger's seat-side portion 44 have different diameters, the driver's seat-side portion 43 has a large diameter while the passenger's seat-side portion 44 has a small diameter due to a difference in the required strengths thereof. Along with this, the press-in hole of the driver's seat-side portion 43 has a large diameter whereas the press-in hole of the passenger's seat-side portion 44 has a small diameter in the connecting element 61. Moreover, the connecting element 61 has such a shape as to negate the difference in diameter between the two portions.

Note that, in either of the above cases, the driver's seat-side portion 43 and the passenger's seat-side portion 44 can be arranged concentrically or non-concentrically. In FIG. 6, the driver's seat-side portion 43 and the passenger's seat-side portion 44 are arranged concentrically.

The connecting element 61 has a length substantially half of the distance from the driver's seat-side stay 27 to the side bracket 25 attached to an outer end of the driver's seat-side portion 43. Along with this, the driver's seat-side portion 43 has a length substantially half of the distance from the driver's seat-side stay 27 to the side bracket 25.

That is, in a case where the vehicle body is divided into three sections in the vehicle width direction 22, i.e., a driver's seat section, a central section, and a passenger's seat section, the driver's seat-side portion 43 has a length substantially equivalent to an outer half of the driver's seat section; the connecting element 61 has a length substantially equivalent to an inner half of the driver's seat section; and the passenger's seat-side portion 44 has a length substantially equivalent to the central section and the passenger's seat section.

The main brackets 24 such as the stays 27, the post bracket 28, the column bracket 32, and the knee protector bracket described above are collectively attached to the connecting element 61. In other words, the connecting element 61 is a core component of the vehicle high-strength element body 23.

Next, the operation of the present embodiment will be described.

According to the present embodiment, the following effects can be achieved.

(a) A high-strength element structure for a vehicle body includes the vehicle high-strength element body 23 provided in the front of a vehicle cabin and extending substantially in a vehicle width direction 22. The vehicle high-strength element body 23 having a pipe-like circular cross section is provided partially with the high rigidity portions 41 and 42 only in the inner diameter portion without any change in an outer diameter shape thereof. It is functionally divided at least into the driver's seat-side portion 43 and the passenger's seat-side portion 44, and the high rigidity portions 41, 42 of the driver's seat-side portion 43 and the passenger's seat-side portion 44 are differently configured. Thereby, the following effects can be achieved.

Specifically, since the high rigidity portions 41 and 42 are provided partially in the inner diameter portion of the vehicle high-strength element body 23, the vehicle high-strength element body 23 can have high strength (such as flexural strength) and high rigidity (such as torsional rigidity) with an increase in the weight thereof reduced to a minimum. In addition, no change is made to the outer diameter shape of the vehicle high-strength element body 23 with a circular cross section (the outer diameter shape remains circular), so that various brackets 24 and the like are easily attachable to the vehicle high-strength element body 23 as in the prior art without any change in the specification of the brackets 24.

Further, the high rigidity portion 41 of the driver's seat-side portion 43 and the high rigidity portion 42 of the passenger's seat-side portion 44 functionally divided are differently configured according to a purpose of the rigidity enhancement, the driver's seat-side portion 43 and the passenger's seat-side portion 44, it is possible to provide required strength and rigidity intensively to required portions thereof. Thereby, in comparison with the high rigidity portions of the same configuration uniformly to the driver's and passenger's seat-side portions, the vehicle high-strength element body 23 can be flexibly designed to be less in weight and at the same time, and enhanced in strength/rigidity.

(b) The vehicle high-strength element body 23 comprises, in a middle part in the vehicle width direction 22, a stay 27 which can support a lower part thereof in the vertical direction 26, and it is structurally divided into the driver's seat-side portion 43 and the passenger's seat-side portion 44 from a position of the stay 27. This can accordingly achieve the following effect.

Specifically, the stay 27 provided in the middle part of the vehicle high-strength element body 23 in the vehicle width direction 22 functions to support the vehicle high-strength element body 23 in the vertical direction 26. Then, the vehicle high-strength element body 23 is structurally divided into the driver's seat-side portion 43 and the passenger's seat-side portion 44 from the position of the stay 27. Thereby, the vehicle high-strength element body 23 can be structurally divided most effectively. Moreover, the purpose of the functional division of the vehicle high-strength element body 23 into the driver's seat-side portion 43 and the passenger's seat-side portion 44 can be achieved more effectively. Further, since the outer diameter shape of the vehicle high-strength element body 23 having a pipe-like circular cross section does not need to be changed, the structurally divided driver's seat-side portion 43 and the passenger's seat-side portion 44 can be joined to each other easily. For example, a joint element can be used to fit the inner ends of the driver's seat-side portion 43 and the passenger's seat-side portion 44 into each other.

(c) As the high rigidity portion 41 of the driver's seat-side portion 43, the high rigidity portion for the upper half driver's seat-side portion 45 is provided in the upper half of the driver's seat-side portion, and the high rigidity portion for the lower half driver's seat-side portion 46 is provided in the lower half of the driver's seat-side portion 43. This can accordingly achieve the following effect.

Specifically, with the provision of the high rigidity portion for the upper half driver's seat-side portion 45, the upper half of the driver's seat-side portion 43 is intentionally given particularly required strength and rigidity. Likewise, with the provision of the high rigidity portion for the lower half driver's seat-side portion 46, the lower half of the driver's seat-side portion 43 is intentionally given particularly required strength and rigidity.

(d) The high rigidity portion for the upper half driver's seat-side portion 45 provided in the rear half of the driver's seat-side portion 43 in the vehicle front-back direction 29 is configured to be the torsional deformation reducing portion 47 which can reduce and prevent the torsional deformation of the driver's seat-side portion 43. This can accordingly achieve the following effect.

Specifically, with the provision of the torsional deformation reducing portion 47 in the rear half of the driver's seat-side portion 43 as the high rigidity portion for the upper half driver's seat-side portion 45, the strength and rigidity of this portion can be improved intensively and efficiently to thereby reduce and prevent the torsional deformation of the driver's seat-side portion 43 effectively. This makes it possible to reduce the influence of, for example, the load of supporting the steering column and the moment or the like on the upper half part of the driver's seat-side portion 43d from the knee protector produced when a load is acted on the vehicle body.

(e) The high rigidity portion for a lower half driver's seat-side portion 46 provided in an middle part of the driver's seat-side portion 43 in the vehicle front-back direction 29 is configured to be the vertical flexure reducing portion 48 which can reduce and prevent flexure of the driver's seat-side portion 43 in the vertical direction 26. This can accordingly achieve the following effect.

Specifically, provided with the vertical flexure reducing portion 48 as the high rigidity portion for the lower half driver's seat-side portion 46, the middle part of the driver's seat-side portion 43 in the vehicle front-back direction 29 can be improved in the strength and rigidity intensively and efficiently to thereby effectively reduce and prevent the flexure of the driver's seat-side portion 43 in the vertical direction 26. This makes it possible to reduce the influence of, for example, the vibration of the vehicle and the like on the lower half of the driver's seat-side portion 43.

(f) As the high rigidity portion 42 of the passenger's seat-side portion 44, the high rigidity portion for the front half of the passenger's seat-side portion 51 is provided in the front half part of the passenger's seat-side portion 44 while the high rigidity portion for the rear half of the passenger's seat-side portion 52 is provided in the rear half part of the passenger's seat-side portion 44. This can accordingly the following effect.

Specifically, with the provision of the high rigidity portion for the front half passenger's seat-side portion 51, the front half of the passenger's seat-side portion 44 is given the particularly necessary strength and rigidity on purpose. Likewise, with the provision of the high rigidity portion for the rear half passenger's seat-side portion 52, the rear half of the passenger's seat-side portion 44 is intentionally given particularly required strength and rigidity.

(g) Each of the high rigidity portions for the front half passenger's seat-side portion 51 and for the rear half passenger's seat-side portion 52 provided in the middle of the passenger's seat-side portion 44 in the vertical direction 26 is configured to be the vehicle longitudinal flexure reducing portions 53 or 54 which can reduce and prevent flexure of the passenger's seat-side portion 44 in the vehicle front-back direction 29. This can accordingly achieve the following effect.

Specifically, provided with the vehicle longitudinal flexure reducing portions 53 and 54 as the high rigidity portions for the front half passenger's seat-side portion 51 and for the rear half passenger's seat-side portion 52, the middle part of the passenger's seat-side portion 44 in the vertical direction 26 can be improved in the strength and rigidity intensively and efficiently to thereby reduce and prevent the flexure of the passenger's seat-side portion 44 in the vehicle front-back direction 29. This makes it possible to reduce the influence of, for example, a load acted on the front half and rear half of the passenger's seat-side portion 44 in the vehicle front-back direction 29 in case of emergency or the like.

(h) The high rigidity portions 41 and 42 provided partially in the inner diameter portion of the vehicle high-strength element body 23 are configured to be the increased thickness portions 55 or the reinforced rib portions 56. This can accordingly achieve the following effect.

Specifically, owing to the increased thickness portions 55 or the reinforced rib portions 56 partially in the inner diameter portion as the high rigidity portions 41 and 42, the vehicle high-strength element body 23 in a simple configuration is provided with high strength and high rigidity effectively and reliably.

Hereinabove, the embodiment of the present invention has been described in detail with reference to the drawings. It is to be understood that this embodiment is only illustrative and exemplary of the present invention. The present invention is not intended to be construed to be limited to the configurations disclosed in the embodiment. Needless to say, variations, or modifications should be considered to be included in the present invention without departing from the gist of the present invention. Further, it should be understood that multiple configurations incorporated in the embodiment, for example, can be combined without any particular description. Further, when multiple embodiments and modifications are disclosed, combinations of two or more of these embodiments and modifications should be considered to be incorporated in the present invention. Moreover, configurations disclosed in the accompanying drawings are naturally considered to be included in the present invention without any particular description. Further, the term, "and/or the like (such as)" is used to indicate that anything equivalent is also included. Also, when the terms such as "substantially", "about", "approximately", are used to indicate that anything within a reasonable range or accuracy are also included.

CROSS REFERENCE TO RELATED APPLICATION

The present application is based on and claims priority from Japanese Patent Application No. 2008-306725, flied in Japanese Patent Office on Dec. 1, 2008, the disclosure of which is hereby incorporated by reference in its entirety.

The invention claimed is:

1. An element for a vehicle body comprising:
a body configured to be disposed at a front of a vehicle cabin and extend substantially in a vehicle width direction, wherein
the element body has a cross section of a circular pipe shape with an inner diameter portion and an outer diameter portion and comprises a rigid portion only in the inner diameter portion and a stay in a middle part in the vehicle width direction which is vertically supportable of a lower part of the element body;
the element body is divided at least into a driver's seat-side portion and a passenger's seat-side portion, such that the rigid portion includes a rigid portion on the driver's seat-side portion and a rigid portion on the passenger's seat-side portion, and the rigid portion on the driver's seat-side portion and the rigid portion on the passenger's seat-side portion are configured differently from each other;
the element body is structurally divided into the driver's seat portion and the passenger's seat-side portion from a position of the stay;
the rigid portion of the driver's seat-side portion includes a rigid portion for an upper half driver's seat-side portion, and a rigid portion for a lower half driver's seat-side portion; and
the rigid portion for the upper half driver's seat-side portion is a torsional deformation reducing portion having an inner curved surface, and is disposed in a rear half of the driver's seat-side portion in a vehicle front-back direction so as to be capable of reducing and preventing torsional deformation of the driver's seat-side portion.

2. The element for a vehicle body according to claim 1, wherein
the rigid portion for the lower half driver's seat-side portion is a vertical flexure reducing portion disposed in a middle of the driver's seat-side portion in the vehicle front-back direction so as to be capable of reducing and preventing vertical flexure of the driver's seat-side portion.

3. The element for a vehicle body according to claim 1, wherein
the rigid portion on the passenger's seat-side portion includes a rigid portion for a front half passenger's seat-side portion, and a rigid portion for a rear half passenger's seat-side portion.

4. The element for a vehicle body according to claim 3, wherein
the rigid portions for the front half and rear half passenger's seat-side portions are both disposed in a middle of the passenger's seat-side portion in the vertical direction so as to be capable of reducing and preventing flexure of the passenger's seat-side portion in the vehicle front-back direction.

5. The element for a vehicle body according to claim 1, wherein
the rigid portion on the driver's seat-side portion and the rigid portion on the passenger's seat-side portion are increased thickness portions or reinforced rib portions disposed partially in the inner diameter portion of the element body.

6. The element for a vehicle body according to claim 1, wherein
the element body includes, in a lower part of the driver's seat-side portion, a steering column supported by a column bracket,
an upper end of the column bracket extends to a rear half of the upper half driver's seat-side portion in the vehicle front-back direction; and
the torsional deformation reducing portion is configured to prevent the torsional deformation of the driver's seat-side portion due to a load of the steering column.

7. The element for a vehicle body according to claim 1, wherein
the torsional deformation reducing portion is formed of protrusions on the inner diameter portion; and
surfaces of the protrusions are curved surfaces.

8. The element for a vehicle body according to claim 1, wherein
the torsional deformation reducing portion is asymmetrically disposed on the inner diameter portion.

9. The element for a vehicle body according to claim 8, wherein the torsional
deformation reducing portion is only disposed in a range of about 0° to 90° in a cross-sectional view in the vehicle front-back direction on the inner diameter portion.

* * * * *